United States Patent
Lindner et al.

(10) Patent No.: US 9,334,379 B2
(45) Date of Patent: May 10, 2016

(54) FIBER-REINFORCED POLYISOCYANURATE COMPONENT AND A METHOD FOR PRODUCTION THEREOF

(71) Applicant: Bayer Intellectual Property GmbH, Monheim (DE)

(72) Inventors: Stefan Lindner, Cologne (DE); Klaus Franken, Bergisch Gladbach (DE); Dirk Passmann, Oberhausen (DE); Peter Nordmann, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 65 days.

(21) Appl. No.: 14/352,103

(22) PCT Filed: Oct. 15, 2012

(86) PCT No.: PCT/EP2012/070391
§ 371 (c)(1),
(2) Date: Apr. 16, 2014

(87) PCT Pub. No.: WO2013/057070
PCT Pub. Date: Apr. 25, 2013

(65) Prior Publication Data
US 2015/0125703 A1 May 7, 2015

(30) Foreign Application Priority Data
Oct. 21, 2011 (EP) .................................... 11186132

(51) Int. Cl.
| | | |
|---|---|---|
| C08J 5/04 | (2006.01) |
| B29C 70/70 | (2006.01) |
| C08G 18/48 | (2006.01) |
| B32B 27/40 | (2006.01) |
| C08G 18/76 | (2006.01) |
| B32B 5/02 | (2006.01) |
| C08J 5/24 | (2006.01) |
| B32B 5/26 | (2006.01) |
| B32B 5/28 | (2006.01) |
| B32B 17/04 | (2006.01) |
| C08G 18/09 | (2006.01) |
| C08G 18/20 | (2006.01) |
| B32B 27/28 | (2006.01) |
| B29C 70/44 | (2006.01) |
| B29C 70/48 | (2006.01) |
| B29K 75/00 | (2006.01) |

(Continued)

(52) U.S. Cl.
CPC .................. *C08J 5/043* (2013.01); *B29C 70/70* (2013.01); *B32B 5/02* (2013.01); *B32B 5/26* (2013.01); *B32B 5/28* (2013.01); *B32B 17/04* (2013.01); *B32B 27/28* (2013.01); *C08G 18/092* (2013.01); *C08G 18/2063* (2013.01); *C08G 18/48* (2013.01); *C08G 18/4829* (2013.01); *C08G 18/7607* (2013.01); *C08G 18/7671* (2013.01); *C08J 5/24* (2013.01); *B29C 70/44* (2013.01); *B29C 70/48* (2013.01); *B29K 2075/00* (2013.01); *B29K 2105/0014* (2013.01); *B29K 2105/0058* (2013.01); *B29K 2313/02* (2013.01); *B29L 2009/005* (2013.01); *B32B 2250/02* (2013.01); *B32B 2250/03* (2013.01); *B32B 2250/04* (2013.01); *B32B 2250/20* (2013.01); *B32B 2250/40* (2013.01); *B32B 2260/023* (2013.01); *B32B 2260/046* (2013.01); *B32B 2262/02* (2013.01); *B32B 2262/101* (2013.01); *B32B 2307/306* (2013.01); *B32B 2307/3065* (2013.01); *B32B 2307/412* (2013.01); *B32B 2307/54* (2013.01); *B32B 2307/718* (2013.01); *B32B 2307/734* (2013.01); *B32B 2379/00* (2013.01); *B32B 2603/00* (2013.01); *B32B 2605/08* (2013.01); *B32B 2605/18* (2013.01); *C08G 2105/02* (2013.01); *C08J 2375/08* (2013.01); *Y10T 428/31547* (2015.04)

(58) Field of Classification Search
CPC .. C08G 18/092; C08G 18/2063; C08G 18/48; C08G 18/4829; C08G 18/7607; C08G 18/7671; C08G 2105/02; C08J 5/043; C08J 5/24; C08J 2375/08; B32B 5/02; B32B 5/26; B32B 5/28; B32B 17/04; B32B 27/28; B32B 27/40; B32B 2250/02; B32B 2250/03; B32B 2250/04; B32B 2250/20; B32B 2250/40; B32B 2260/023; B32B 2260/046; B32B 2262/02; B32B 2262/101; B32B 2307/306; B32B 2307/3065; B32B 2307/412; B32B 2307/54; B32B 2307/718; B32B 2307/734; B32B 2379/00; B32B 2603/00; B32B 2605/08; B32B 2605/18; B29C 70/44; B29C 70/48; B29C 70/70; Y10T 428/31547; B29L 2009/005; B29K 2105/0014; B29K 2075/00; B29K 2313/02
USPC ....................................... 428/423.1; 427/133
See application file for complete search history.

(56) References Cited

U.S. PATENT DOCUMENTS

| | | | | |
|---|---|---|---|---|
| 4,003,859 A | | 1/1977 | Reymore, Jr. et al. | |
| 4,452,829 A | * | 6/1984 | Smith ........................... | 427/209 |

(Continued)

FOREIGN PATENT DOCUMENTS

| | | | | |
|---|---|---|---|---|
| JP | 2004237643 A | * | 8/2004 | .............. B29C 43/18 |
| WO | 0166669 A2 | | 9/2001 | |
| WO | 2011081622 A1 | | 7/2011 | |

*Primary Examiner* — Thao T Tran
(74) *Attorney, Agent, or Firm* — Donald R. Palladino; Robert S. Klemz

(57) ABSTRACT

The present invention relates to fiber-composite components that are produced by impregnating fibers with a reaction resin mixture of polyisocyanates, polyols, trimerization catalysts and optionally additives, and to a method for production thereof.

10 Claims, No Drawings

(51) Int. Cl.
*B29K 105/00* (2006.01)
*B29L 9/00* (2006.01)

(56) References Cited

U.S. PATENT DOCUMENTS

| | | | | |
|---|---|---|---|---|
| 4,670,346 A | * | 6/1987 | Smith | 428/422.8 |
| 4,810,444 A | * | 3/1989 | Alberino et al. | 264/102 |
| 4,946,922 A | * | 8/1990 | Reisch et al. | 528/76 |
| 5,073,576 A | * | 12/1991 | Kuyzin et al. | 521/99 |
| 2002/0045690 A1 | * | 4/2002 | Cheolas et al. | 524/194 |
| 2011/0237741 A1 | * | 9/2011 | Bleys et al. | 524/590 |
| 2012/0244006 A1 | | 9/2012 | Passmann et al. | |

\* cited by examiner

FIBER-REINFORCED POLYISOCYANURATE COMPONENT AND A METHOD FOR PRODUCTION THEREOF

The present invention relates to heat-resistant fiber-reinforced polyisocyanurate components which are obtainable through saturation of fibers with a reactive resin mixture made of polyisocyanates, polyols, trimerization catalyst, and also optionally additives, and also to a process for production of these.

DE 10 2009 058 101 A1 describes the use of layered structures in wind turbines in which polyurethane is used as polymer. The ratio of number of isocyanate groups to number of groups reactive toward isocyanate is preferably from 0.9 to 1.5. The ratio of number of isocyanate groups to number of groups reactive toward isocyanate in the examples was about 1.02. The process has the disadvantage that the viscosity of the mixture is relatively high and that therefore the polymer-containing fiber layer is relatively difficult to produce.

WO 2011/081622 A1 describes polyurethane compositions for composite structures. The composite structures can be used for rotor blades of wind turbines. The OH/NCO ratio is at least 1, i.e. there are at least as many OH groups as NCO groups. The process has the disadvantage that the viscosity is relatively high and the processing period is very short; this makes it much more difficult to carry out the charging process for large components.

Fiber-reinforced polymers are used as structural material because these have high mechanical strength combined with low weight. The matrix material here is usually composed of unsaturated polyester resins, vinyl ester resins, and epoxy resins.

Fiber composite materials can be used by way of example in aircraft construction, in automobile construction, or in rotor blades of wind turbines.

The known processes for the production of fiber composite components can be utilized, an example being manual lamination, transfer molding, resin transfer molding, or vacuum-assisted infusion processes (such as VARTM (vacuum-assisted resin transfer molding)), or prepreg technology. Particular preference is given to vacuum-assisted infusion processes, since these can produce large components.

However, the processes known hitherto have the disadvantage that hardening of the reactive resin mixture takes a very long time, with resultant low productivity. In order to increase productivity it is necessary to reduce the production cycle time. In this context it is important that the reactive resin mixture has very low viscosity and retains low viscosity for a long time, so that it saturates the fibers rapidly and completely. On the other hand, the curing time should be minimized, so as to reduce cycle time. The manufacturing time for fiber composite components can thus be significantly shortened. For economic reasons, a low hardening temperature is desirable in order to save energy costs. At the same time, the fiber composite components are intended to have high heat resistance, since they can by way of example be severely heated by insolation, and must be prevented from suffering any resultant loss of mechanical stability.

It was therefore an object of the present invention to provide a matrix material which permits good saturation and wetting of the fibers and at the same time ensures rapid hardening and good heat resistance.

Surprisingly, said object was achieved via fiber composite components which are obtainable from fiber layers and from a reactive resin mixture made of polyisocyanates, polyols, trimerization catalysts, and also optionally conventional additives, where the ratio of number of isocyanate groups to number of OH groups is selected in such a way that a polyisocyanurate is formed.

Polyisocyanurates (PIRs) are formed through trimerization of isocyanate groups. The isocyanurate ring is very stable. Formation of PIR structures is catalyzed by strong bases, particularly by alkali metal acetates and alkali metal formates. The reaction is known for the production of rigid PIR foams. Here, the isocyanates initially react preferentially with polyols to give polyurethanes, and during the further course of the reaction, when most of the OH groups have been consumed by reaction, polyisocyanurate formation occurs. Surprisingly, it was also possible to use the reaction for the production of compact, optically transparent, fiber-reinforced PIR sheets with good heat resistance.

The invention provides fiber composite components comprising a polyisocyanurate-containing fiber layer, where the polyisocyanurate is obtainable from a reaction mixture comprising A) one or more polyisocyanates
B) one or more polyols, and
C) one or more trimerization catalysts, where the ratio of number of isocyanate groups to number of OH groups is from 1.6 to 6.0.

It is preferable that the ratio of number of isocyanate groups to number of OH groups is from 1.8 to 4.0, particularly from 2.1 to 3.5.

Trimerization catalysts initiate and accelerate the trimerization of isocyanate groups to give isocyanurate groups.

It is preferable that the reaction mixture comprises no epoxy resins.

It is preferable that the composite component of the invention has, on one of the two sides of the polyisocyanurate-containing fiber layer, what is known as a spacer-material layer and optionally an additional, second polyisocyanurate-containing fiber layer that follows the spacer layer and that preferably comprises the same polyisocyanurate as the first-mentioned fiber layer.

Preferred fiber composite components have, on the other of the two sides of the first-mentioned polyisocyanurate-containing fiber layer, one or more protective and/or decorative layers. The protective layers are preferably one or more gelcoat layers, preferably made of polyurethane (PUR) resins, epoxy resins, unsaturated polyester resins, or vinyl ester resins.

A preferred fiber composite component has, on that side of the polyisocyanurate-containing fiber layer that is opposite to the gelcoat layer, what is known as a spacer layer, followed by another polyisocyanurate-containing fiber layer which preferably comprises the same polyisocyanurate as the first-mentioned fiber layer. By way of example, the spacer layer is composed of balsa wood, PVC foam, PET foam, or PUR foam. The spacer layer can be present on the entire area of the fiber layer or on part of that area. Its thickness can moreover vary across the area.

Particular preference is given to a fiber composite component which comprises, in the fiber layer, a polyisocyanurate composed of from 60 to 90% by weight, preferably from 65 to 85% by weight, of polyisocyanates (A), from 10 to 40% by weight, preferably from 15 to 35% by weight, of polyols (B), and from 0.01 to 2% by weight, preferably from 0.1 to 1% by weight, of trimerization catalyst (C), where the sum of the proportions by weight of the components is 100% by weight.

The fiber content in the fiber composite part is preferably more than 50% by weight, particularly preferably more than 65% by weight, based on the total weight of the fiber composite component. In the case of glass fibers by way of example, ashing can be used subsequently to determine fiber content, and input weight can be monitored.

The fiber composite component, preferably the glassfiber composite component, is optically transparent in order that the component can be tested optically for defects (e.g. air inclusions). The optical transparency of the glassfiber composite part in accordance with ISO 13468-2 is preferably greater than 20%, particularly preferably greater than 60%, very particularly preferably greater than 80%.

The invention also provides a process for the production of the fiber composite components where
a) a mixture is produced comprising
   A) one or more polyisocyanates
   B) one or more polyols, and
   C) one or more trimerization catalysts,
   where the ratio of number of isocyanate groups to number of OH groups is from 1.6 to 6.0,
b) a fiber material is used as initial charge in a mold half,
c) the mixture produced in a) is introduced into the fiber material of b) for the production of a saturated fiber material,
d) the saturated fiber material hardens at a temperature of from 20 to 120° C., preferably from 70 to 100° C.

It is preferable that the ratio of number of isocyanate groups to number of OH groups is from 1.8 to 4.0, and particularly from 2.1 to 3.5.

It is preferable that the mixture produced in a comprises no epoxy resins.

It is preferable that a release agent is provided to the mold half before the fiber material is introduced. Prior to introduction of the fiber material it is possible to introduce further protective or decorative layers into the mold half, for example one or more gelcoat layers.

In a preferred embodiment, what is known as a spacer layer is applied to the fiber material already located in the mold half, and a further fiber-material layer, made of, by way of example, fiber mats, woven fiber fabric, or laid fiber scrim, is applied to the spacer layer. The polyisocyanurate mixture is then poured into the layers. The spacer layer is composed by way of example of balsa wood, polyvinyl chloride (PVC) foam, polyethylene terephthalate (PET) foam, or polyurethane (PUR)-foam.

It is preferable that, after the insertion of the fiber material into the mold half, a foil is placed onto the fiber material, vacuum is generated between the foil and the mold half, and the reaction mixture is introduced via the foil (vacuum assisted resin transfer molding (VARTM)). This process can also produce large components, such as rotor blades of wind turbines. It is also possible, if necessary, to introduce what are known as flow aids (e.g. in the form of mats that are pressure-resistant but resin-permeable) between the foil and the fiber material, and these can in turn be removed after the hardening process.

In the RTM (Resin Transfer Molding) process, which is likewise preferred, the mold is closed by an opposite half, rather than by the vacuum-tight foil, and the resin mixture is charged optionally under pressure into the mold.

The reactive resin mixtures used in the invention have low viscosities and long processing times, and have short hardening times at low hardening temperatures, and thus permit rapid manufacture of fiber composite components.

Another advantage of the reactive resin mixtures used in the invention is improved processing performance. The reactive resin mixtures can be produced and processed at low temperatures. This leads to slow hardening of the components. The components of the reactive resin mixtures can be mixed at from 20 to 50° C., preferably at from 30 to 40° C., and applied to the fiber material.

In order to ensure good saturation of the fibers, the reactive resin mixture should preferably have low viscosity during the charging process, and retain low viscosity for as long as possible. This is particularly necessary in the case of large components, since the charging time here is very long (for example up to one hour), it is preferable that the viscosity of the reactive resin mixture of the invention at 25° C. directly after mixing is from 10 to 300 mPas, with preference from 20 to 80 mPas, with particular preference from 30 to 50 mPas. It is preferable that the viscosity of the reactive resin mixture of the invention at a constant temperature of 25° C. 30 minutes after the mixing of the components is smaller than 1000 mPas, particularly smaller than 500 mPas. The viscosity was determined 30 minutes after mixing of the components at a constant temperature of 25° C. with a rotary viscometer at a shear rate of 60 l/s.

The reactive mixture used in the invention can be processed in casting machines using static mixers or using dynamic mixers, since the mixing time required is only short. This is a major advantage in the production of the fiber composite components of the invention, since for good saturation the reactive resin mixture must have minimal viscosity.

Polyisocyanate component A) used comprises the usual aliphatic, cycloaliphatic, and in particular aromatic di- and/or polyisocyanates. Examples of these suitable polyisocyanates are butylene 1,4-diisocyanate, pentane 1,5-diisocyanate, hexamethylene 1,6-diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes and mixtures of these having any desired isomer content, cyclohexylene 1,4-diisocyanate, phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) and/or higher homologues (pMDI), 1,3- and/or 1,4-bis(2-isocyanatoprop-2-yl)benzene (TMXDI), and 1,3-bis(isocyanatomethyl)benzene (XDI). It is also possible to use, alongside the abovementioned polyisocyanates, some proportion of modified polyisocyanates having uretdione structure, isocyanurate structure, urethane structure, carbodiimide structure, uretonimine structure, allophanate structure, or biuret structure. Isocyanate used preferably comprises diphenylmethane diisocyanate (MDI) and in particular mixtures of diphenylmethane diisocyanate and polyphenylene polymethylene polyisocyanate (pMDI). The mixtures of diphenylmethane diisocyanate and polyphenylene polymethylene polyisocyanate (pMDI) have a preferred monomer content of from 60 to 100% by weight, preferably from 70 to 95% by weight, particularly preferably from 80 to 90% by weight. The NCO content of the polyisocyanate used should preferably be above 25% by weight, with preference above 30% by weight, with particular preference above 32% by weight. The NCO content can be determined in accordance with DIN 53185. The viscosity of the isocyanate should preferably be ≤150 mPas (at 25° C.), with preference ≤50 mPas (at 25° C.), and with particular preference of ≤30 mPas (at 25° C.).

If a single polyol is added, the OH number thereof gives the OH number of component B). In the case of mixtures, the numeric-average OH number is stated. This value can be determined with reference to DIN 53240-2. The polyol formulation preferably comprises, as polyols, those having a numeric-average OH number of from 100 to 1000 mg KOH/g with preference from 300 to 600 mg KOH/g, and with particular preference from 350 to 500 mg KOH/g. The viscosity of the polyols is preferably ≤800 mPas (at 25° C.). The polyols preferably have at least 60% of secondary OH groups, with preference at least 80% of secondary OH groups, and with particular preference at least 90% of secondary OH groups. Particular preference is given to polyether polyols based on propylene oxide. It is preferable that the average functionality of the polyols used is from 2.0 to 5.0, particularly from 2.5 to 3.5.

The invention can use polyether polyols, polyester polyols, or polycarbonate polyols, preference being given to polyether polyols. Examples of polyether polyols that can be used in the invention are the polytetramethylene glycol polyethers obtainable via polymerization of tetrahydrofuran by means of cationic ring-opening. Equally suitable polyether polyols are adducts of styrene oxide, ethylene oxide, propylene oxide, and/or butylene oxides onto di- or polyfunctional starter molecules. Examples of suitable starter molecules are water, ethylene glycol, diethylene butyl dialycol, glycerol, diethylene trimethylolpropane, propylene glycol, pentaerythritol, sorbitol, sucrose, ethylenediamine, toluenediamine, triethanolamine, 1,4-butanediol, 1,6-hexanediol, and also low-molecular-weight, hydroxylated esters of polyols of this type with carboxylic acids; other examples are hydroxylated oils. Preference is given to glycerol as starter. The viscosity of the polyols is preferably ≤800 mPas (at 25° C.). It is preferable that the polyols have at least 60% of secondary OH groups, with preference at least 80% of secondary OH groups, and with particular preference 90% of secondary OH groups. Polyether polyols based on propylene oxide are particularly preferred.

The polyols B) can also comprise fibers, fillers, and polymers.

Trimerization catalysts C) used can be the known nucleophilic trimerization catalysts, mostly bases (tertiary amines, salts of weak acids, for example potassium acetate), and organometallic compounds. It is preferable to use latently reactive trimerization catalysts. It is particularly preferable to use latently reactive trimerization catalysts which begin to initiate and to accelerate the trimerization of isocyanate groups to give isocyanurate groups only when temperatures reach from 50 to 100° C.

Preferred latently reactive trimerization catalysts are salts of tertiary amines. These latently reactive trimerization catalysts can be obtained by way of example by chemical blocking of a catalytically active amine. The chemical blocking can be achieved by protonation of a tertiary amine by an acid such as, by way of example, formic acid, acetic acid, ethylhexanoic acid, or oleic acid, or of a phenol. Trialkylamines and heterocyclic amines can be used as amine, examples being trimethylamine, triethylamine, tripropylamine, tributylamine, dimethylcyclohexylamine, dimethylbenzylamine, dibutylcyclohexylamine, dimethylethanolamine, triethanolamine, diethylethanolamine, ethyldiethanolamine, dimethylisopropanolamine, triisopropanolamine, triethylenediamine, tetramethyl-1,3-butanediamine, N,N,N',N'-tetramethylethylenediamine, N,N,N',N'-tetramethylhexane-1,6-diamine, N,N,N',N',N''-pentamethyldiethylenetriamine, bis(2-dimethylaminoethoxy)methane, N,N,N'-trimethyl-N'-(2-hydroxyethyl)ethylenediamine, N,N-dimethyl-N',N'-(2-hydroxyethyl)ethylenediamine, tetramethylguanidine, N-methylpiperidine, N-ethylpiperidine, N-methylmorpholine, N-ethylmorpholine, 1,4-dimethylpiperidine, 1,2,4-trimethylpiperidine, N-(2-dimethylaminoethyl)morpholine, 1-methyl-4-(2-dimethyl-amino)piperidine, 1,4-diazabicyclo[2.2.2]octane, 1,8-diazabicyclo[5.4.0]undec-7-ene, and 1,5-diazabicyclo[4.3.0]-5-nonane. Particular preference is given to 1,8-diazabicyclo[5.4.0]undec-7-ene.

Particularly preferred trimerization catalysts are amines selected from the group consisting of trimethylamine, triethylamine, tripropylamine, tributylamine, dimethylcyclohexylamine, dimethylbenzylamine, dibutylcyclohexylamine, dimethylethanolamine, triethanolamine, diethylethanolamine, ethyldiethanolamine, dimethylisopropanolamine, triisopropanolamine, triethylenediamine, tetramethyl-1,3-butanediamine, N,N,N',N'-tetramethylethylenediamine, N,N,N',N'-tetramethylhexane-1,6-diamine, N,N,N',N',N''-pentamethyldiethylenetriamine, bis(2-dimethylaminoethoxy)methane, N,N,N'-trimethyl-N'-(2-hydroxyethyl)ethylenediamine, N,N-dimethyl-N',N'-(2-hydroxyethyl)ethylenediamine, tetramethylguanidine, N-methylpiperidine, N-ethylpiperidine, N-methylmorpholine, N-ethylmorpholine, 1,4-dimethylpiperidine, 1,2,4-trimethylpiperidine, N-(2-dimethylaminoethyl)morpholine, 1-methyl-4-(2-dimethylamino)-piperidine, 1,4-diazabicyclo[2.2.2]octane, 1,8-diazabicyclo[5.4.0]undec-7-ene, and 1,5-diazabicyclo[4.3.0]-5-nonane, where each of these takes the form of phenolate salt, ethylhexoate salt, oleate salt, acetate salt, or formate salt.

Examples of latently reactive trimerization catalysts that are available commercially are Polycat® SA1/10 (phenol-blocked 1,8-diazabicyclo[5.4.0]undec-7-ene (=DBU)), Polycat® SA 102/10, DABCO® 8154 (formic-acid-blocked triethylenediamine), and DABCO® WT.

Particular preference is given, as trimerization catalyst, to 1,8-diazabicyclo[5.4.0]undec-7-ene, which takes the form of phenolate salt, ethylhexoate salt, oleate salt, acetate salt, or formate salt.

Surprisingly, it has been found that said latently reactive polyurethane (PUR) catalysts also catalyze the formation of polyisocyanurates (PIRs) at elevated temperature. This permits the production of large fiber composite components, since at the charging temperature no polyisocyanurate formation yet occurs, and the low viscosity permits rapid saturation of the fiber-filled molds, and hardening is delayed until subsequent heat-conditioning takes place.

The invention also provides fiber composite components comprising a fiber layer that has been saturated with polyisocyanurate, where the polyisocyanurate is obtainable from a reaction mixture comprising
A) one or more polyisocyanates
B) one or more polyols, and
C) one or more trimerization catalysts,
where the ratio of number of isocyanate groups to number of OH groups is from 1.6 to 6.0.

Additives D) can optionally be added. These are by way of example deaerators, antifoams, fillers, flame retardants, and reinforcing materials. Other known additives and additional materials can be used if necessary.

It is also possible to add flame retardants to the foamable preparations in order to improve fire resistance, examples being phosphorus-containing compounds, especially phosphates and phosphonates, and also halogenated polyesters and polyols, or chloroparaffins. It is also possible to add nonvolatile flame retardants, such as melamine or expandable graphite, which expands greatly when exposed to flame and thus seals the surface, thus preventing further exposure to heat.

Fiber material used can comprise sized or unsized fibers, such as glass fibers, carbon fibers, steel fibers or iron fibers, natural fibers, aramid fibers, polyethylene fibers, or basalt fibers. Particular preference is given to glass fibers. The fibers can be used in the form of short fibers of length from 0.4 to 50 mm. Preference is given to continuous-filament-fiber-reinforced composite components via use of continuous fibers.

Arrangement of the fibers in the fiber layer can be unidirectional, randomly distributed, or woven. In components with a fiber layer made of a plurality of plies, there is the possibility of ply-to-ply fiber orientation. It is possible here to produce unidirectional fiber layers, cross-bonded layers, or multidirectional fiber layers, where unidirectional or woven plies are laminated to one another. It is particularly preferable to use semifinished fiber products as fiber material, an example being woven fabrics, laid scrims, braided fabrics, mats, nonwovens, knitted fabrics, or 3D semifinished fiber products.

The PIR conversion of the resultant polyisocyanurate is preferably above 20%, with preference above 40%, and with particular preference above 60%. The PIR conversion is the proportion of isocyanate groups that has reacted to give PIR. It can be detected by infrared spectroscopy.

The strength of the resultant polyisocyanurate in the tensile test in accordance with DIN EN ISO 527 is preferably above 70 MPa, with preference above 80 MPa, in order to withstand the high mechanical stresses in components such as a rotor blade.

The modulus of elasticity of the resultant polyisocyanurate in the tensile test in accordance with DIN EN ISO 527 is preferably above 2700 MPa, with preference above 2900 MPa, in order to withstand the high mechanical stresses in components such as a rotor blade.

The heat deflection temperature (HDT) of the resultant polyisocyanurate in accordance with DIN EN ISO 75-1/75 2004, method A with a flexural stress of 1.8 N/mm² is preferably above 70° C., with preference above 75° C., and with particular preference above 80° C., in order to withstand the high thermal stresses in components.

The fiber composite components of the invention can be used for the production of rotor blades of wind turbines, for the production of bodywork components of automobiles or in aircraft construction, in components used to construct in the construction of buildings or of roads (e.g. manhole cover), and in other structures subject to high loads.

The invention will be explained in further detail with reference to the examples below.

EXAMPLES

In order to determine matrix properties, moldings (sheets) made of various polyisocyanurate systems and polyurethane systems were produced and compared. The polyol mixtures, which comprised the trimerization catalyst, were degassed for 60 minutes at a pressure of 1 mbar, and then admixed with the isocyanate. This blend was degassed for about 5 minutes at a pressure of 1 mbar, and then poured into sheet molds. The sheets were cast at room temperature and heat-conditioned overnight in a drying oven heated to 80° C. The thickness of the sheets was 4 mm. This gave optically transparent sheets. The quantitative data and properties can be found in the table.

The sheets were used to produce test samples for a tensile test in accordance with DIN EN ISO 527, and modulus of elasticity and strength were determined.

Heat deflection temperature (HDT) was determined in accordance with DIN EN ISO 75 1/75 2004—method A with a flexural stress of 1.8 N/mm² and a heating rate of 120 K/h.

The composition from inventive examples 1 to 4 was used to produce optically transparent, glassfiber-reinforced polyisocyanurate materials by the vacuum-infusion process with glassfiber content above 60% by weight. To this end, four layers of a UD glass laid scrim with a weight of glass per unit area of 1040 g/m² per layer were charged to a mold, sealed with a vacuum foil, and evacuated. The composition of inventive examples 1 to 4, which had previously been degassed for about 5 minutes, was then sucked into the system. Once the material had been charged to the mold, the component was heat-conditioned overnight at 80° C.

Viscosity was determined 30 minutes after mixing of the components at a constant temperature of 25° C. with a rotary viscometer at a shear rate of 60 l/s.

Starting Compounds:

Polyol 1: Glycerol-started polypropylene oxide polyol with functionality 3 and with OH number 400 mg KOH/g, and with viscosity 375 mPas (at 25° C.).

Polyol 2: Glycerol-started polypropylene oxide polyol with functionality 3 and with OH number 450 mg KOH/g, and with viscosity 420 mPas (at 25° C.).

Polycat® SA 1/10: product from Air Products. Phenol salt of 1,8-diazabicyclo[5.4.0]undec-7-ene in dipropylene glycol. The OH number was 83 mg KOH/g.

Isocyanate 1: Mixture of diphenylmethane 4,4'-diisocyanate (MDI) with isomers and higher-functionality homologs with NCO content 32.5% by weight; viscosity at 25° C.: 20 mPas. The mixture comprises about 51% by weight of diphenylmethane 4,4'-diisocyanate, 30% by weight of diphenylmethane 2,4'-diisocyanate, 6% by weight of diphenylmethane 2,2'-diisocyanate, and 13% by weight of higher-functionality homologs of MDI.

Isocyanate 2: Mixture of diphenylmethane 4,4'-diisocyanate (MDI) with isomers and higher-functionality homologs with NCO content 32.6% by weight; viscosity at 25° C.: 20 mPas. The mixture comprises about 60% by weight of diphenylmethane 4,4'-diisocyanate, 22% by weight of diphenylmethane 2,4'-diisocyanate, 3% by weight of diphenylmethane 2,2'-diisocyanate, and 15% by weight of higher-functionality homologs of MDI.

All quantitative data in the following table are in parts by weight.

TABLE

|  | Inventive example 1 | Inventive example 2 | Inventive example 3 | Inventive example 4 | Comparative example 5 | Comparative example 6 |
| --- | --- | --- | --- | --- | --- | --- |
| Polyol 1 | 100 | 118 | 130 | 98 | 200 | — |
| Polyol 2 | — | — | — | — | — | 200 |
| Polycat SA1/10 | 2 | 2 | 2 | 2 | — | — |
| Isocyanate 1 | 300 | 280 | 268 | — | — | — |
| Isocyanate 2 | — | — | — | 300 | 202 | 227 |
| NCO/OH molar ratio | 3.2 | 2.6 | 2.2 | 3.3 | 1.1 | 1.1 |
| Viscosity directly after mixing at 25° C. [mPas] | 34 | 45 | 49 | 49 | 112 | 122 |

TABLE-continued

|  | Inventive example 1 | Inventive example 2 | Inventive example 3 | Inventive example 4 | Comparative example 5 | Comparative example 6 |
|---|---|---|---|---|---|---|
| Viscosity 30 min. after mixing at 25° C. [mPas] | 173 | 352 | 461 | 625 | 504 | 716 |
| Tensile test: Modulus of elasticity [MPa] | 2966 | 2773 | 2819 | 2981 | 2936 | 3038 |
| Tensile test: Strength [MPa] | 80.9 | 83.7 | 83.5 | 79.7 | 72.9 | 80.3 |
| HDT [° C.] | 78 | 89 | 81 | 77 | 66 | 73 |

Inventive examples 1 to 4 give compact and optically transparent moldings which combine very good mechanical properties, for example modulus of elasticity above 2700 MPa, strength above 75 MPa, and HDT value above 75° C. Production of fiber-reinforced components requires especially a very low viscosity, since this permits markedly faster and more uniform charging of material to the molds. Cycle times can thus be shorter, since the time for which the molds have to be occupied is shorter. The latently reactive trimerization catalyst used leads to very rapid hardening at 80° C.

Comparative examples 5 and 6 were produced with a molar NCO/OH ratio of 1.1. Since the reaction with trimerization catalyst was already excessively rapid, operations here were carried out without trimerization catalyst. With trimerization catalyst, viscosity 30 minutes after mixing at 25° C. is 3320 mPas (0.5 part by weight of Polycat SA1/10 for every 100 parts of polyol+isocyanate) for comparative example 5 and 5980 mPas (0.5 part by weight for every 100 parts of polyol and isocyanate) for comparative example 6. Although the latently reactive trimerization catalysts are especially effective at elevated temperatures and thus lead to rapid hardening of the sample during the subsequent heat-conditioning procedure, they also catalyze the polyurethane reaction to a small extent even at 25° C. However, this effect is markedly smaller for the inventive examples 1 to 4, since the subsequent crosslinking takes place via the polyisocyanurate reaction. Although operations were carried out without trimerization catalyst in comparative examples 5 and 6, the viscosity rise after 30 minutes is relatively high, and the initial viscosity is, especially, markedly higher than in inventive examples 1 to 4. Since the charging procedure takes more time, cycle time rises markedly, and each mold is utilized for a longer time; this leads to markedly higher costs. Furthermore, higher viscosity makes wetting of the fibers more difficult.

In comparative example 6 the OH number of the polyol was increased in order to achieve a further increase in the level of mechanical properties of the PUR system. However, this is achieved at the cost of increased viscosity and an increased viscosity rise.

Only the examples of the invention achieved the very good level of mechanical properties and an HDT above 75° C. in combination with a very low initial viscosity below 50 mPas; this leads to high productivity in the production of large fiber-reinforced components.

Flame retardancy was determined by determining vertical flame spread for edge-flame-application by a small-burner test based on DIN 53438-2. In inventive example 1 self-extinguishment occurred as early as 5 seconds after flame removal, and flame height was max. 70 mm. In contrast to this, no self-extinguishment occurred in comparative example 6, and flame height was greater than 150 mm; the test was therefore failed.

Flame retardancy was markedly improved by the formation of polyisocyanurates. Flame retardancy is a decisive property for many fiber composite components, since it reduces risk in the final application (e.g. of a rotor blade or of a bodywork part).

What is claimed is:

1. A fiber composite component comprising a polyisocyanurate-containing fiber layer, wherein the polyisocyanurate is obtained from a reaction mixture comprising:
   A) one or more polyisocyanates
   B) one or more polyols, and
   C) one or more latently reactive trimerization catalysts comprising a phenolate, ethylhexoate, oleate, acetate or formate of 1,8-diazabicyclo[5.4.0]undec-7-ene,
   wherein the ratio of number of isocyanate groups to number of OH groups is from 1.6 to 6.0 wherein there are one or more gelcoat layers present on one side of the polyisocyanurate-containing fiber layer.

2. The fiber composite component as claimed in claim 1, wherein on the side of the polyisocyanurate-containing fiber layer that is opposite to the gelcoat layer there is a spacer layer present, which is followed by another polyisocyanurate-containing fiber layer.

3. The fiber composite component as claimed in claim 1, wherein there is, on one side of the polyisocyanurate-containing fiber layer, a spacer layer which is followed by another polyisocyanurate-containing fiber layer.

4. A rotor blade of a wind turbine comprising the fiber composite component of claim 1.

5. A bodywork component of an automobile or aircraft comprising the fiber composite component of claim 1.

6. A component of a building comprising the fiber composite component of claim 1.

7. A manhole cover comprising the fiber composite component of claim 1.

8. A process for the production of the fiber composite component comprising:
   a) charging a fiber material in a mold half,
   b) introducing a mixture into the fiber material to produce a saturated fiber material, wherein the mixture comprises:
      A) one or more polyisocyanates
      B) one or more polyols, and
      C) one or more latently reactive trimerization catalysts comprising a phenolate, ethylhexoate, oleate, acetate or formate of 1,8-diazabicyclo[5.4.0]undec-7-ene,
      wherein the ratio of number of isocyanate groups to number of OH groups is from 1.6 to 6.0, and
      wherein the saturated fiber material hardens at a temperature of from 20 to 120° C. wherein the process further comprises the step of a') introducing one or more gelcoat layers into the mold half before step a).

9. The process as claimed in claim 8, wherein after the step a) or a') and before the step b) a spacer-material layer and then a fiber-material layer are introduced into the mold half.

10. The process as claimed in claim 8, wherein step b) is carried out by a vacuum infusion process.

* * * * *